(12) United States Patent
Ahn et al.

(10) Patent No.: US 8,900,742 B2
(45) Date of Patent: Dec. 2, 2014

(54) SECONDARY BATTERY AND METHOD OF MANUFACTURING THE SECONDARY BATTERY

(75) Inventors: Changbum Ahn, Yongin-si (KR); Kyugil Choi, Yongin-si (KR); Jeongsoon Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 789 days.

(21) Appl. No.: 12/904,070

(22) Filed: Oct. 13, 2010

(65) Prior Publication Data

US 2011/0104541 A1    May 5, 2011

(30) Foreign Application Priority Data

Nov. 2, 2009   (KR) .................. 10-2009-0104813

(51) Int. Cl.
| | | |
|---|---|---|
| *H01M 6/12* | (2006.01) | |
| *H01M 6/46* | (2006.01) | |
| *H01M 4/00* | (2006.01) | |
| *H01M 6/10* | (2006.01) | |
| *H01M 4/02* | (2006.01) | |
| *H01M 4/13* | (2010.01) | |
| *H01M 2/26* | (2006.01) | |
| *H01M 10/04* | (2006.01) | |
| H01M 10/0525 | (2010.01) | |
| H01M 10/0587 | (2010.01) | |
| H01M 10/42 | (2006.01) | |

(52) U.S. Cl.
CPC .......... *H01M 2/263* (2013.01); *H01M 10/0409* (2013.01); *H01M 10/0431* (2013.01); *H01M 10/0525* (2013.01); *H01M 10/0587* (2013.01); *H01M 2010/4292* (2013.01)
USPC .............. 429/162; 429/94; 429/209; 429/211

(58) Field of Classification Search
USPC ............ 429/178, 158, 162, 233, 94, 209, 211
See application file for complete search history.

(56) References Cited

U.S. PATENT DOCUMENTS

| | | |
|---|---|---|
| 2,584,168 A | 2/1952 | Sutowski |
| 5,707,758 A | 1/1998 | Iwatsu et al. |

(Continued)

FOREIGN PATENT DOCUMENTS

| | | |
|---|---|---|
| JP | 10-162861 | 6/1998 |
| JP | 11-073995 | 3/1999 |

(Continued)

OTHER PUBLICATIONS

Japanese Office action dated Jul. 31, 2012, for corresponding Japanese Patent application 2009-280692, (3 pages).

(Continued)

*Primary Examiner* — Patrick Ryan
*Assistant Examiner* — Julian Anthony
(74) *Attorney, Agent, or Firm* — Christie, Parker & Hale, LLP (57) ABSTRACT

A secondary battery and a method of manufacturing the secondary battery. A secondary battery includes an electrode assembly formed through winding a positive electrode plate including a positive electrode non-coating portion, a negative electrode plate including a negative electrode non-coating portion, and a separator between the positive and negative electrode plates. A part of the positive electrode non-coating portion and a part of the negative electrode non-coating portion are removed to form a positive electrode tab and a negative electrode tab at first and second ends, respectively, of the electrode assembly.

10 Claims, 5 Drawing Sheets

(56) References Cited

U.S. PATENT DOCUMENTS

| | | |
|---|---|---|
| 6,387,567 B1 | 5/2002 | Noh |
| 7,727,674 B2 * | 6/2010 | Yanagida et al. ............. 429/245 |
| 2003/0232243 A1 | 12/2003 | Hong |
| 2006/0093910 A1 | 5/2006 | Yoon et al. |
| 2006/0286454 A1 | 12/2006 | Hong |
| 2009/0239133 A1 | 9/2009 | Kosugi |
| 2010/0086845 A1 | 4/2010 | Jung et al. |

FOREIGN PATENT DOCUMENTS

| | | |
|---|---|---|
| JP | 2000-058012 | 2/2000 |
| JP | 2004-241149 | 8/2004 |
| JP | 2008-108743 | 5/2005 |
| JP | 2006-128132 | 5/2006 |
| JP | 2008-226625 | 8/2008 |
| JP | 2008-293982 | 12/2008 |
| KR | 10-0213657 B1 | 8/1999 |
| KR | 10-0483994 B1 | 4/2005 |
| KR | 10-2006-0034180 | 4/2006 |
| KR | 10-0612364 B1 | 8/2006 |
| KR | 10-2007-0122370 | 12/2007 |
| KR | 10-0821857 B1 | 4/2008 |
| WO | WO 2006/068431 A1 | 6/2006 |
| WO | WO 2007/114579 A1 | 10/2007 |

OTHER PUBLICATIONS

Patent Abstracts of Japan, and English machine translation of Japanese Publication 10-162861 listed above, (6 pages).

Patent Abstracts of Japan, and English machine translation of Japanese Publication 11-073995-listed above, (12 pages).

Patent Abstracts of Japan, and English machine translation of Japanese Publication 2000-058012 listed above, (9 pages).

Patent Abstracts of Japan, and English machine translation of Japanese Publication 2004-241149 listed above, (15 pages).

KIPO Notice of Allowance dated Mar. 23, 2012, for Korean priority Patent application 10-2009-0104813, (5 pages).

European Office action dated Apr. 26, 2012, for corresponding European Patent application 10189597.7, (4 pages).

Espacenet English Abstract for Korean Publication 20030095519, corresponding to Korean Patent 10-0483994 listed above.

Korean Patent Abstracts for Korean Publication 1020060037594, corresponding to Korean Patent 10-0612364 listed above.

European Search Report dated Jan. 18, 2011, for corresponding European Patent application 10189597.7.

* cited by examiner

SECONDARY BATTERY AND METHOD OF MANUFACTURING THE SECONDARY BATTERY

CROSS-REFERENCE TO RELATED APPLICATION

This application claims priority to and the benefit of Korean Patent Application No. 10-2009-0104813, filed on Nov. 2, 2009, the entire content of which is incorporated herein by reference.

BACKGROUND

1. Field

Embodiments of the present invention relate to a secondary battery and a method of manufacturing the secondary battery.

2. Description of the Related Art

A secondary battery generally is formed by storing an electrode assembly with electrolyte in an outer case. The electrode assembly is constituted of a positive electrode plate, a negative electrode plate, and a separator interposed between the two electrode plates.

An electrode assembly with a plurality of positive electrode tabs and a plurality of negative electrode tabs is required to form a high capacity secondary battery. For electrode assemblies formed by winding, forming a plurality of positive electrode tabs and a plurality of negative electrode tabs is typically not easy and, therefore, an improved secondary battery and method of manufacturing is needed.

SUMMARY

Embodiments of the present invention are directed to a secondary battery and a method of manufacturing a secondary battery, which overcome or substantially overcome one or more of the problems resulting from the limitations and disadvantages of the related art.

Aspects of embodiments of the present invention provide a secondary battery including an electrode assembly formed with a plurality of positive electrode tabs and a plurality of negative electrode tabs, and a method of manufacturing the secondary battery.

Other aspects of embodiments of the present invention provide a secondary battery and a method of manufacturing the secondary battery which increase space efficiency.

Other aspects of embodiments of the present invention provide a secondary battery and a method of manufacturing the secondary battery that facilitate electrolyte impregnation.

Other aspects of embodiments of the present invention provide a secondary battery having light weight and a method of manufacturing the secondary battery.

According to one exemplary embodiment of the present invention, a secondary battery includes an electrode assembly formed through winding a positive electrode plate including a positive electrode non-coating portion, a negative electrode plate including a negative electrode non-coating portion, and a separator between the positive and negative electrode plates, wherein a part of the positive electrode non-coating portion and a part of the negative electrode non-coating portion are removed to form a positive electrode tab and a negative electrode tab at first and second ends, respectively, of the electrode assembly.

The removed part of the positive electrode non-coating portion may include a curved portion at both sides, and the removed part of the negative electrode non-coating portion may include a curved portion at both sides.

The secondary battery may further include an outer case containing the electrode assembly. The positive electrode tab may be bent in the outer case, and the positive electrode tab may be bent in a V-shape, a U-shape, or an S-shape. The negative electrode tab may be bent in the outer case, and the negative electrode tab may be bent in a V-shape, a U-shape, or an S-shape.

The secondary battery may further include a positive electrode terminal attached to the positive electrode tab, and a negative electrode terminal attached to the negative electrode tab. The positive electrode terminal may have a width corresponding to a width of the positive electrode tab, and the negative electrode terminal may have a width corresponding to a width of the negative electrode tab.

The positive electrode tab may include a plurality of stacked layers, and the negative electrode tab may include a plurality of stacked layers.

According to another exemplary embodiment of the present invention, a method of manufacturing a secondary battery includes stacking a negative electrode plate having a negative electrode non-coating portion, a first separator, a positive electrode plate having a positive electrode non-coating portion, and a second separator; winding the stacked positive electrode plate, negative electrode plate, and first and second separators into a flattened form; removing a part of the negative electrode non-coating portion and a part of the positive electrode non-coating portion; and storing the wound positive electrode plate, negative electrode plate, and first and second separators in an outer case, wherein the negative electrode non-coating portion and the positive electrode non-coating portion are located at opposite sides along a winding direction.

The parts removed in the removing of the parts of the negative and positive electrode non-coating portions may include curved parts at both sides of the negative electrode non-coating portion and curved parts at both sides of the positive electrode non-coating portion.

The removing of the parts of the negative and positive electrode non-coating portions may be performed utilizing a laser.

The removing of the parts of the negative and positive electrode non-coating portions may be performed utilizing a mold including a fixed portion and a movable portion that is movable with respect to the fixed portion.

The manufacturing method may further include attaching a negative electrode terminal and a positive electrode terminal to the negative electrode non-coating portion and the positive electrode non-coating portion, respectively.

In the attaching of the negative and positive electrode terminals, overlapped parts of the negative electrode non-coating portion may be coupled together, and overlapped parts of the positive electrode non-coating portion may be coupled together.

In one embodiment, the parts removed in the removing of the parts of the negative and positive non-coating portions may be all parts of the negative electrode non-coating portion except where the negative electrode terminal is coupled, and all parts of the positive electrode non-coating portion except where the positive electrode terminal is coupled.

In one embodiment, in the storing of the wound positive electrode plate, negative electrode plate, and first and second separators in the outer case, the positive electrode terminal and the negative electrode terminal are bent within the outer case.

According to another embodiment of the present invention, a cutting apparatus for removing at least one part of a non-coating portion of at least one of a first electrode plate or a second electrode plate of an electrode assembly formed through winding the first electrode plate, the second electrode plate, and a separator between the first and second electrode plates includes a fixed portion adapted to receive the electrode assembly thereon; and a movable portion that is movable with respect to the fixed portion.

In one embodiment, the fixed portion includes a stand having a perimeter shape corresponding to a perimeter shape of the electrode assembly other than the at least one part to be removed, and the moving portion has a receiving space formed in a surface thereof facing the stand, the receiving space having a perimeter shape corresponding to the perimeter shape of the stand.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Certain exemplary embodiments are described more fully herein with reference to the accompanying drawings; however, embodiments of the present invention may be embodied in different forms and should not be construed as limited to the embodiments set forth herein. Rather, these exemplary embodiments are provided by way of example for understanding of the invention and to convey the scope of the invention to those skilled in the art.

Figure 1:
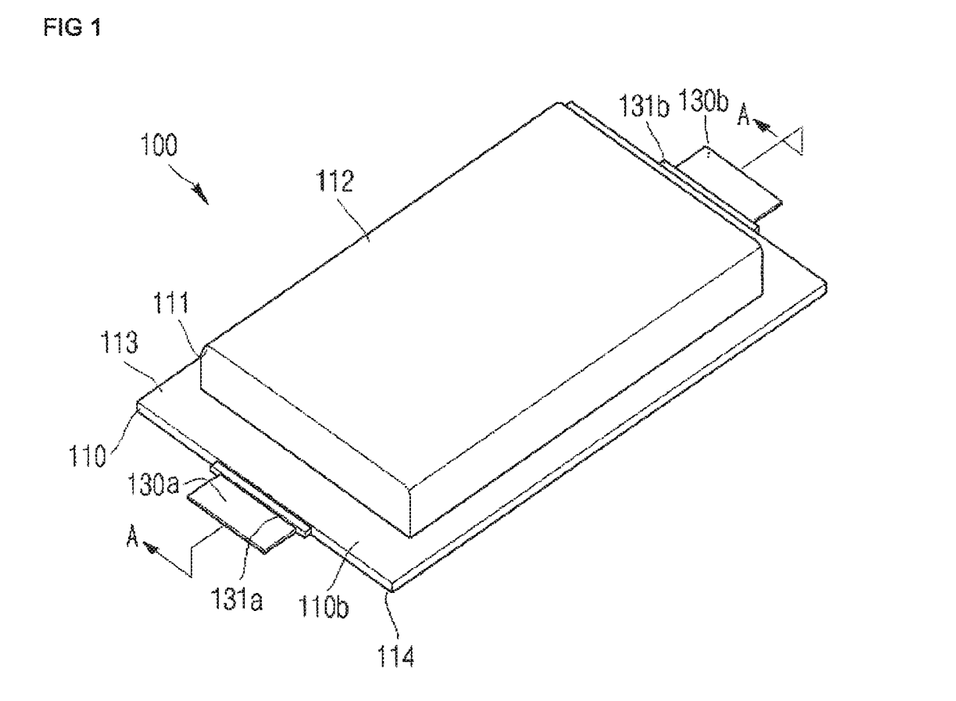
FIG. 1 is a perspective view of a secondary battery according to an embodiment of the present invention.
Figure 2:
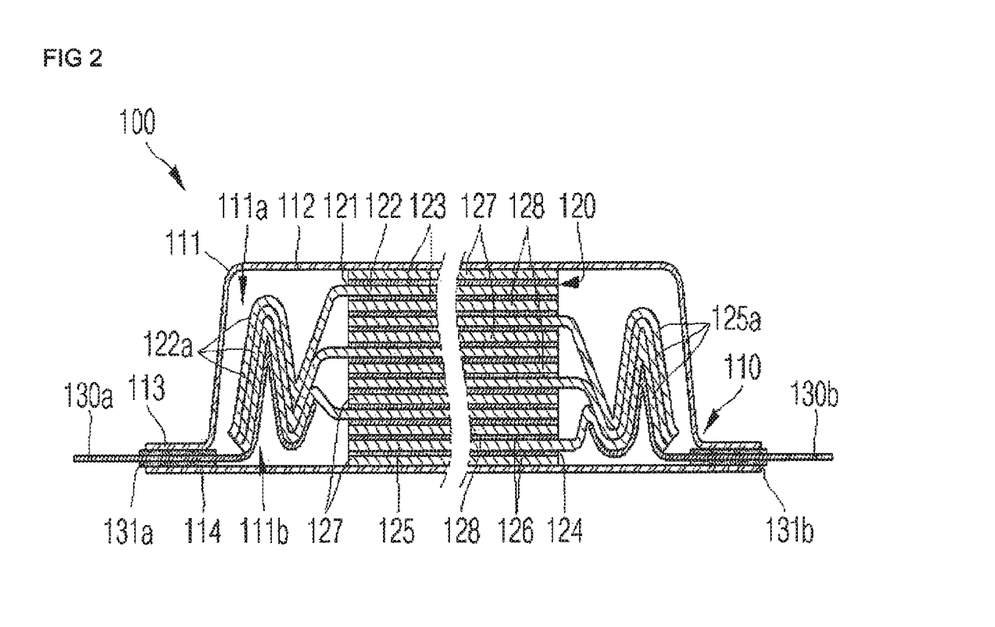
FIG. 2 is a sectional view of the secondary battery of FIG. 1, taken along line A-A.
Figure 3:
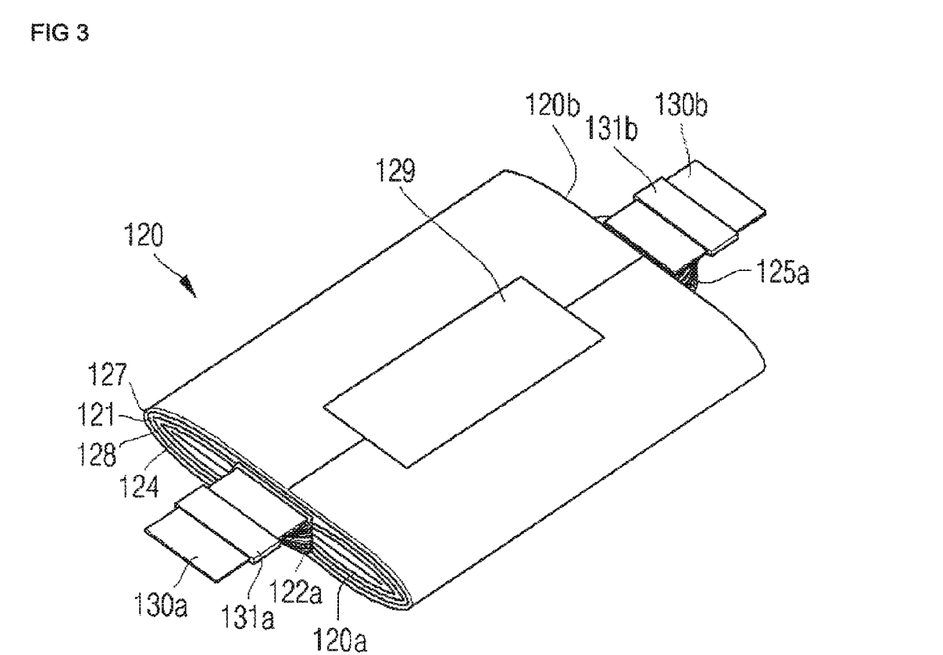
FIG. 3 is a perspective view of an electrode assembly of the secondary battery of FIG. 1.

FIG. 1 is a perspective view of a secondary battery according to an embodiment of the present invention, FIG. 2 is a sectional view of the secondary battery of FIG. 1, taken along line A-A, and FIG. 3 is a perspective view of an electrode assembly of the secondary battery.

Referring to FIGS. 1 and 2, a secondary battery 100 is provided with an outer case 110, and an electrode assembly 120 housed in the outer case 110.

The outer case 110, in one embodiment, is a pouch-type case provided with a first sheet 111 and a second sheet 114. The first sheet 111 includes a receiving portion 112 defining a space 111a that holds the electrode assembly 120, and a flange 113 coupled to the second sheet 114. An open end 111b is formed in the receiving portion 112. The flange 113 extends outward from the open end 111b of the receiving portion 112. The second sheet 114, in one embodiment, is flat or substantially flat and covers the open end 111b of the receiving portion 112.

The first sheet 111 and the second sheet 114, in one embodiment, each has one surface formed of a thermally adhesive film material, and the remainder formed of a plurality of films of any other suitable material or combination of materials that are coupled to one another in a stacked formation. With this configuration, the respective surfaces of the flange 113 of the first sheet 111 and the second sheet 114 that are formed of the thermally adhesive material are attached to each other and then heated and pressed together to seal the first and second sheets 111 and 114. A sealed portion 110b is thereby formed corresponding to the flange 113 on the edge of the outer case 110.

The first and second sheets 111 and 114 may be formed having a three-layered configuration of a polyolefin layer, an aluminum layer, and a nylon layer. The polyolefin layer (e.g., a polyolefin-based resin layer) performs a sealing function due to its thermal adhesiveness. The aluminum layer functions as a material for maintaining mechanical strength of the outer case 110 and for providing a barrier layer for moisture and oxygen. The nylon layer functions as a protective layer. In one embodiment, CPP (Cast Polypropylene) is utilized.

Referring to FIGS. 1 to 3, with the electrode assembly 120 in a flat state, it is provided with a first electrode plate 121 (e.g., a positive electrode plate), a second electrode plate 124 (e.g., a negative electrode plate), and first and second separators 127 and 128 interposed between the first and second electrode plates 121 and 124. The electrode assembly 120, in one embodiment, is formed by winding the first and second electrode plates 121 and 124 and the first and second separators 127 and 128 in a stacked configuration. A positive electrode tab 122a and a negative electrode tab 125a are disposed at a first end 120a and a second end 120b, respectively, where the wound structure of the electrode assembly 120 is exposed.

The first electrode plate 121, in one embodiment, includes a positive electrode collector 122, and a positive electrode active material 123 coated on either side of the positive electrode collector 122. The positive electrode collector 122, in one embodiment, is formed of a conductive plate, such as aluminum, or any other suitable conductive metal or other conductive material.

A positive electrode non-coating portion that does not have the positive electrode active material 123 formed thereon is provided on the positive electrode collector 122, and portions of the positive electrode non-coating portion are removed to form a plurality of positive electrode tabs 122a. A manufacturing method in which these portions are removed is described in further detail later herein. Each of the plurality of positive electrode tabs 122a is formed to have the same size and shape, or substantially the same size and shape, and be overlapped in the same position. A width of the positive electrode tabs 122a, in one embodiment, corresponds to a width of a positive electrode terminal 130a. The positive electrode terminal 130a, in one embodiment, projects outward from the outer case 110 and is bonded to the positive electrode tabs 122a using a method such as ultrasonic welding or resistance welding. Here, the positive electrode tabs 122a of the plurality of positive electrode tabs are stacked and coupled together. In one embodiment, the portion at which the plurality of positive electrode tabs 122a and the positive electrode terminal 130a are coupled is bent in a V-shape or a U-shape within the outer case 110 to reduce or minimize space. Alternatively, this portion may be bent in an S-shape. The positive electrode terminal 130a protrudes through the sealed portion 110b of the outer case 110 to the outside, and in one embodiment, insulation tape 131a is wound around the positive electrode terminal 130a such that the insulation tape 131 contacts the sealed portion 110b.

The positive electrode active material 123, in one embodiment, is formed to include a layered compound including lithium, a conductor that improves conductivity, and a binder that increases coupling force between the layered compound and the conductor.

The second electrode plate 124, in one embodiment, includes a negative electrode collector 125, and a negative electrode active material 126 coated on either side of the negative electrode collector 125. The negative electrode collector 125, in one embodiment, is formed of a conductive plate, such as copper, or any other suitable conductive metal or other conductive material.

A negative electrode non-coating portion that does not have the negative electrode active material 126 formed thereon is provided on the negative electrode collector 125, and portions of the negative electrode non-coating portion are removed to form a plurality of negative electrode tabs 125a. A manufacturing method for removing these portions is described in further detail later herein. The negative electrode tabs 125a in plurality are disposed at the side opposite to the plurality of positive electrode tabs 122a, and extend in a direction opposite to that of the positive electrode tabs 122a. Each of the plurality of negative electrode tabs 125a is formed to have the same size and shape, or substantially the same size and shape, and be overlapped in the same position. A width of the negative electrode tabs 125a in one embodiment, corresponds to a width of a negative electrode terminal 130b. Negative electrode tabs 125a of the plurality of negative electrode tabs 125a, in one embodiment, are formed by removing portions of the non-coating portion of the negative electrode collector 125, and a manufacturing method thereof will be described in further detail later herein. The negative electrode terminal 130b, in one embodiment, projects outward from the outer case 110 and is bonded to the negative electrode tabs 125a using a method such as ultrasonic welding or resistance welding. Here, the negative electrode tabs 125a of the plurality of negative electrode tabs 125a are stacked and coupled together. In one embodiment, the portion at which the plurality of negative electrode tabs 125a and the negative electrode terminal 130b are coupled together is bent in a V-shape or U-shape within the outer case 110 to reduce or minimize space. Alternatively, this portion may be bent in an S-shape. The negative electrode terminal 130b protrudes through the sealed portion 110b of the outer case 110 to the outside, and in one embodiment, insulation tape 131b is wound around the negative electrode terminal 130b such that the insulation tape contacts the sealed portion 110b.

The negative electrode active material 126, in one embodiment, is formed with carbon, such as graphite containing carbon, and a binder that increases binding force of carbon particles. The negative electrode active material 126 may also, or alternatively, be formed with tin oxide (SnO) or lithium titanium oxide (LTO). When graphite is used for the negative electrode active material, the corresponding positive electrode plate may be formed having a smaller area than the negative electrode plate. Alternatively, when SnO or LTO is used for the negative electrode active material, the corresponding positive plate may be formed having a larger area than the negative plate.

Fine pores are formed in the first separator 127 and the second separator 128, in one embodiment, such that lithium ions may pass through the fine pores between the first and second electrode plates 121 and 124. The first separator 127 and the second separator 128, in one embodiment, are formed of a high-polymer resin such as polyethylene (PE) or polypropylene (PP) but, alternatively, may be formed of any other suitable material.

Finishing tape 129, in one embodiment, is attached to the outer peripheral end of the wound electrode assembly 120 to prevent or substantially prevent the electrode assembly 120 from unraveling.

A description of a method of manufacturing a secondary battery according to embodiments of the present invention will now be provided.

Figure 4:
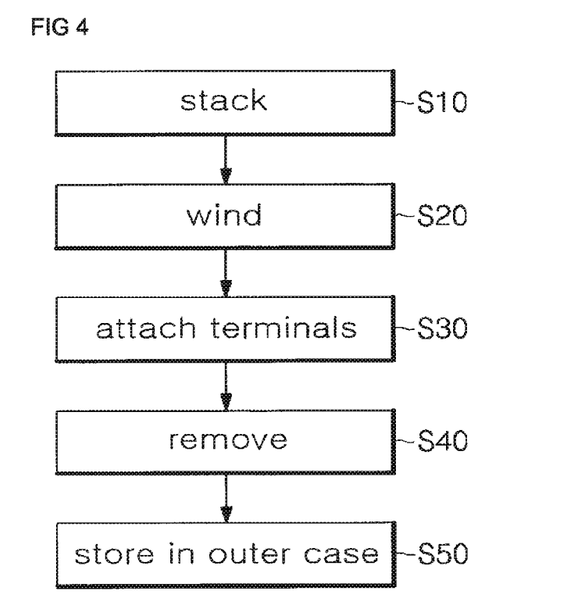
FIG. 4 is a flowchart of a method of manufacturing a secondary battery according to an embodiment of the present invention.

FIG. 4 is a flowchart illustrating a method of manufacturing a secondary battery according to an embodiment of the present invention. FIGS. 5 to 8 are views showing various stages in the manufacturing of a secondary battery according to embodiments of the present invention.

Referring to FIG. 4, a method of manufacturing a secondary battery according to an embodiment of the present invention includes stacking in operation S10, winding in operation S20, attaching terminals in operation S30, removing in operation S40, and storing in an outer case in operation S50.

Figure 5:
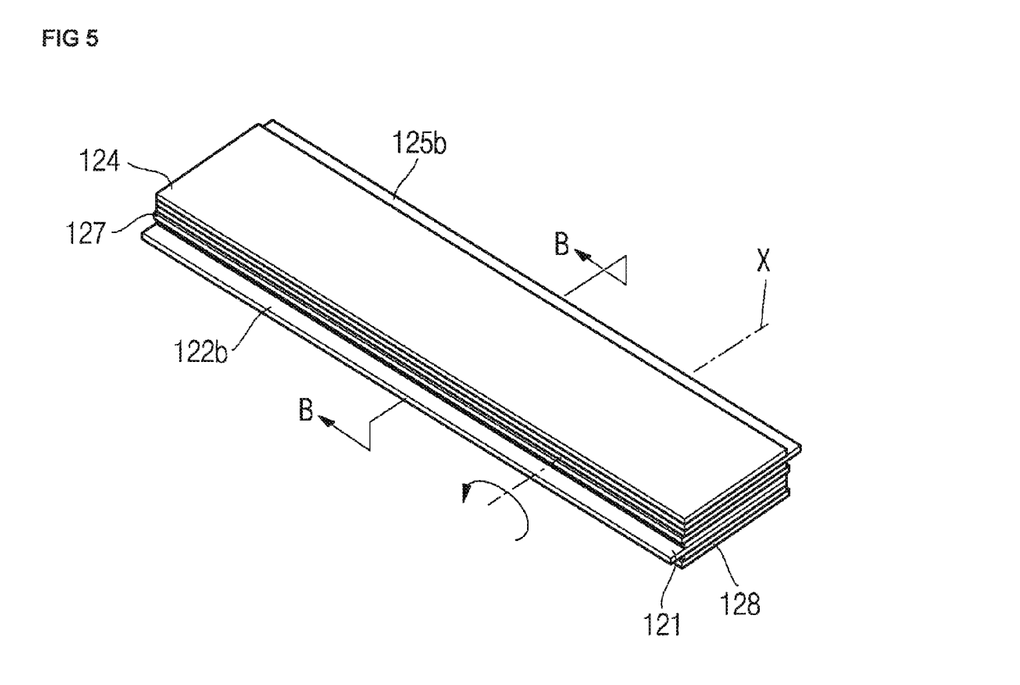
FIG. 5 is a perspective view illustrating a structure stacked through a stacking operation of the method of manufacturing a secondary battery of FIG. 4.
Figure 6:
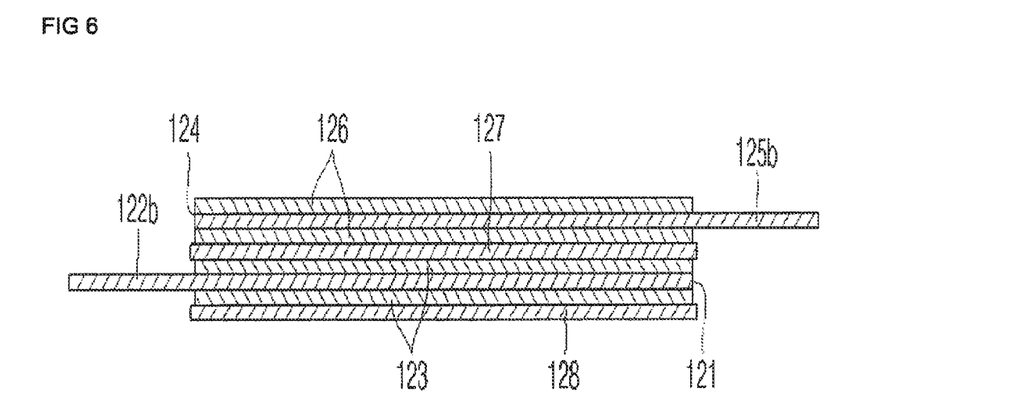
FIG. 6 is a sectional view illustrating the structure of FIG. 5, taken along line B-B.

First, the stacking in operation S10 will be described. In the stacking operation S10, a positive electrode plate, a negative electrode plate, and a separator are stacked. FIG. 5 is a perspective view illustrating a structure of a positive electrode plate, a negative electrode plate, and a separator stacked through stacking operation S10, and FIG. 6 is a sectional view illustrating the stacked structure in FIG. 5 taken along line B-B. Referring to FIGS. 5 and 6, from top to bottom, the second electrode plate 124 (e.g., a negative electrode plate), the first separator 127, the first electrode plate 121 (e.g., a positive electrode plate), and the second separator 128 are stacked and extend along an extension axis (X). A non-coating portion 125b formed on the second electrode plate 124, and a non-coating portion 122b formed on the first electrode plate 121 are formed at opposite sides about the extension axis (X). The first separator 127 and the second separator 128 are located corresponding to regions where the positive electrode active material 123 of the first electrode plate 121 and the negative electrode active material 126 of the second electrode plate 124 are formed. Accordingly, the non-coating portion 122b of the first electrode plate 121 and the non-coating portion 125b of the second electrode plate 124 extend to regions outside the first and second separators 127 and 128.

Figure 7:
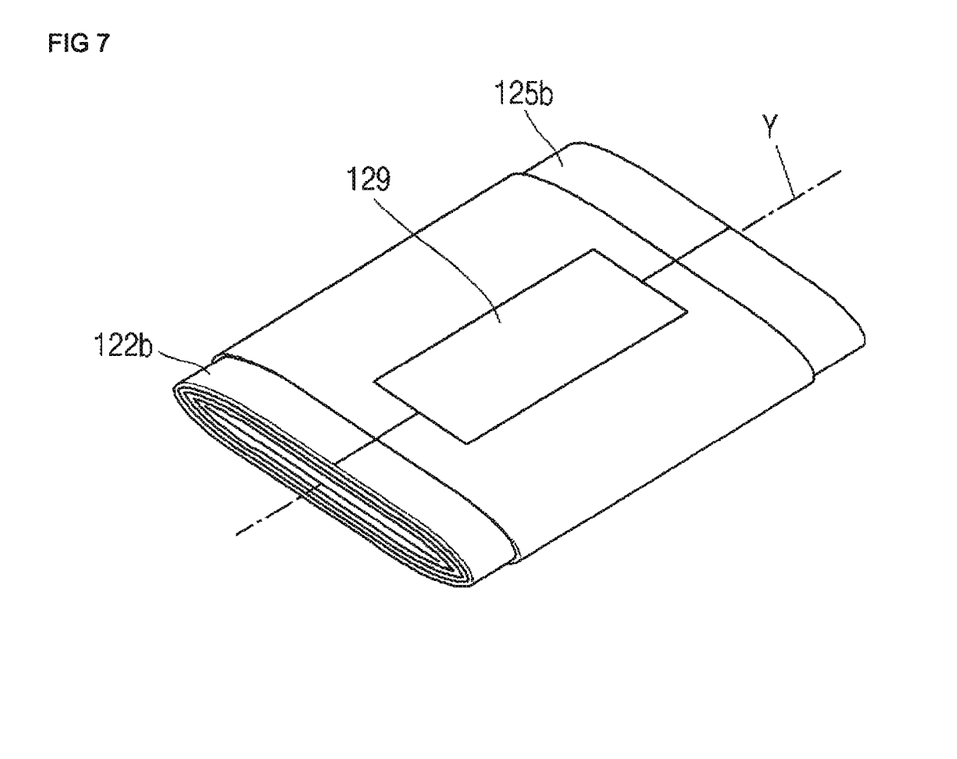
FIG. 7 is a perspective view illustrating the structure of FIG. 5 after winding through a winding operation of the method of manufacturing a secondary battery of FIG. 4.

Next, the winding operation S20 will be described. The winding operation S20 is operation of winding the stacked structure illustrated in FIG. 5. From the stacked state illustrated in FIG. 5, the stacked first electrode plate 121, second electrode plate 124, and first and second separators 127 and 128 are flatly wound along the extension axis (X) indicated by the arrows. A state after completion of winding in the winding operation S20 is illustrated in FIG. 7. Referring to FIG. 7, the wound non-coating portion 122b of the first electrode plate 121, and the wound non-coating portion 125b of the second electrode plate 124 are located at opposite sides along a winding axis (Y). The finishing tape 129, in one embodiment, is attached to the outer peripheral end of the wound first electrode plate 121, second electrode plate 124, and first and second separators 127 and 128 to prevent or substantially prevent unraveling.

Figure 8:
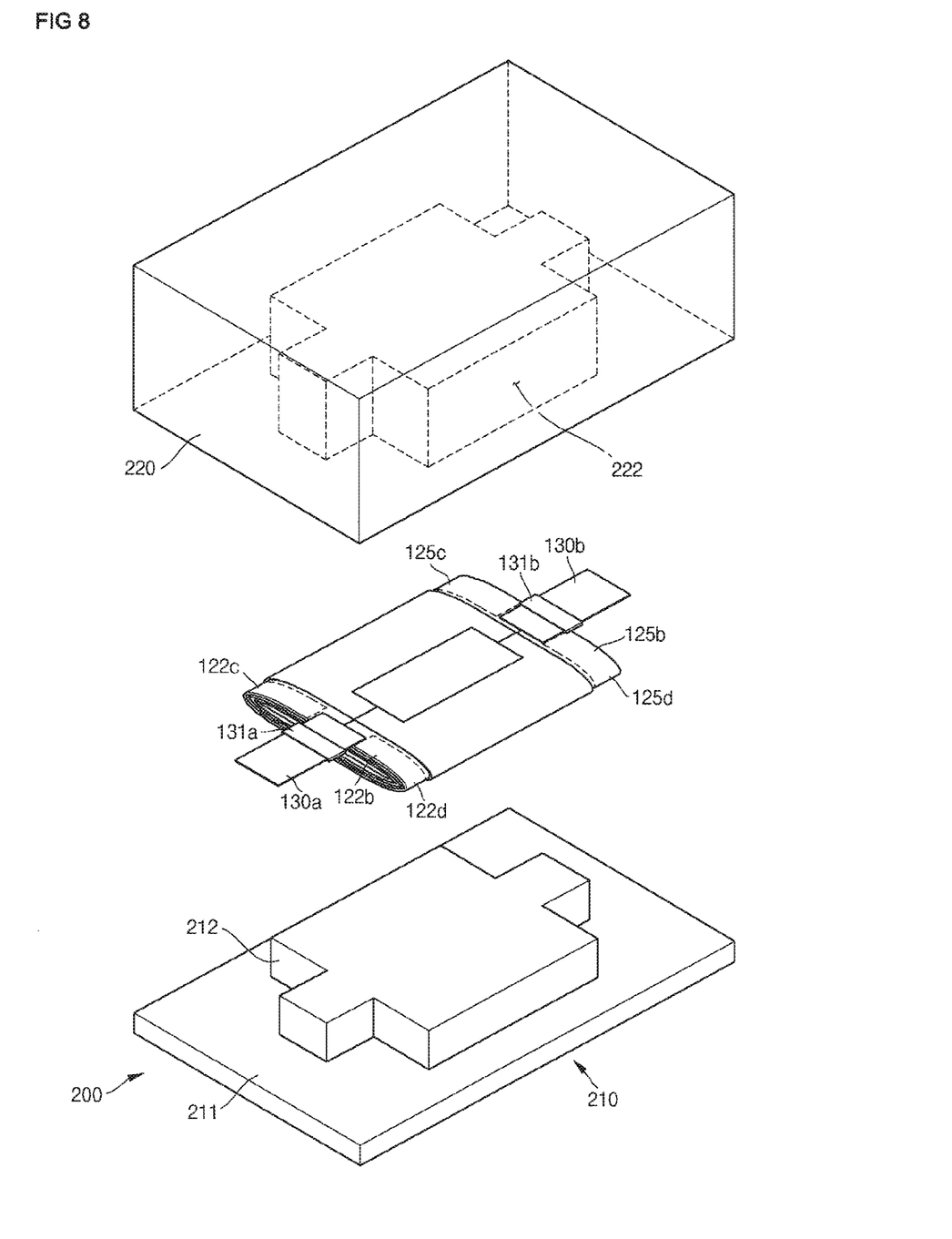
FIG. 8 is a perspective view illustrating the structure of FIG. 5 after attaching terminals through a terminal attaching operation of the method of manufacturing a secondary battery of FIG. 4, and also illustrating a cutting apparatus for removing portions of non-coating portions of electrode plates of the structure of FIG. 5 in a removing operation of the method of manufacturing a secondary battery of FIG. 4.

Next, the terminal attaching operation S30 will be described. The terminal attaching operation S30 is one in which the positive electrode terminal and the negative electrode terminal are formed. According to one embodiment, the positive electrode terminal 130a and the negative electrode terminal 130b are attached to the first and second ends, respectively, of the wound structure illustrated in FIG. 7 through thermal bonding, or any other suitable method or device, to the center of the positive electrode non-coating portion 122b and the center of the negative electrode non-coating portion 125b to provide the state of the structure illustrated in FIG. 8. Here, the overlapped positive electrode non-coating portion 122b and the overlapped negative electrode non-coating portion 125b are combined at the region where the positive electrode terminal 130a and the negative electrode terminal 130b are coupled. Referring to FIG. 8, in one embodiment, the positive electrode terminal 130a and the negative electrode terminal 130b extend in directions opposite from one another. Further, in one embodiment, the insulation tape 131a and 131b is wound around the positive electrode terminal 130a and the negative electrode terminal 130b, respectively.

Next, removing the portions of the positive electrode non-coating portion and the negative electrode non-coating portion in the removing operation S40 will be described. In the removing operation S40, a part of the positive electrode non-coating portion and the negative electrode non-coating portion is removed. From the electrode assembly state illustrated in FIG. 8, the parts of the positive electrode non-coating portion 122b and the negative electrode non-coating portion 125b depicted via the dashed lines are removed. The removed portions 122c, 122d, 125c, and 125d are parts of the positive electrode non-coating portion 122b and the negative electrode non-coating portion 125b other than those where the positive electrode terminal 130a and the negative electrode terminal 130b are coupled (e.g., the parts outside of the regions where the positive and negative electrode terminals 130a, 130b are coupled to the respective positive and negative electrode non-coating portions 122b, 125b). That is, the removed parts include either side end of the bent positive electrode non-coating portion 122b, and either side end of the negative electrode non-coating portion 125b. Thus, because each side end of the positive and negative electrode non-coating portions 122b, 125b is removed, the portions from the positive electrode non-coating portion 122b and the negative electrode non-coating portion 125b can be easily bent, as illustrated in FIG. 2. Also, because the amount of electrolyte adhered to the non-coating portions can be reduced, electrolyte impregnation can easily occur. Furthermore, the weight of the secondary battery may be reduced by the weight of the removed non-coating portions 122c, 122d, 125c, 125d. The removing operation S40, in one embodiment, is performed utilizing a cutting apparatus 200 (e.g., a cutting mold), as depicted in FIG. 8.

The cutting apparatus 200, in one embodiment, includes a fixed portion 210 and a moving, or movable, portion 220. The fixed portion 210, in one embodiment, includes a base 211 and a stand 212 projecting from the base 211. In the removing operation S40, an electrode assembly in the state illustrated in FIG. 8 is placed on the stand 212. The stand 212 has a perimeter shape corresponding to the shape of the electrode assembly illustrated in FIG. 8, from which the removed portions 122c, 122d, 125c, and 125d are absent. Further, a receiving space 222, having a perimeter shape corresponding to the stand 212 is formed in a surface of the moving portion 220 facing the stand 212. As the moving portion 220 moves with respect to the fixed portion 210 (i.e. toward the fixed portion 210), the removed portions 122c, 122d, 125c, and 125d are removed from the electrode assembly illustrated in FIG. 8. Of course, in an alternative embodiment of the cutting apparatus 200, the stand 212 may be on the moving portion 220, and the receiving space 222 may be formed in the fixed portion 210.

Further, alternatively to utilizing the cutting apparatus 200 or another cutting apparatus, the removing operation S40 may be performed utilizing a laser or any other suitable method or device. The electrode assembly 120 is completed, as illustrated in FIG. 3, after undergoing the removing operation S40. The parts that are not removed and left remaining from the positive electrode non-coating portion 122b and the negative electrode non-coating portion 125b are the positive electrode tab 122a and the negative electrode tab 125a to which the positive electrode terminal 130a and the negative electrode terminal 130b are coupled, respectively.

Next, storing the electrode assembly in the outer case in the storing operation S50 will be described. The electrode assembly 120 structured as illustrated in FIG. 3 is stored, for example, in the receiving portion 112 of the first sheet 111 in the outer case 110 illustrated in FIG. 2. Next, the second sheet 114 is thermally bonded to the flange 113 of the first sheet 111 to seal the first sheet 111 with the second sheet 114. Here, the positive electrode tab 122a and the negative electrode tab 125a are bent, such as in V-shapes, U-shapes, or S-shapes. Also, the insulation tape 131a enclosing the positive electrode terminal 130a, and the insulation tape 131b enclosing the negative electrode terminal 130b are disposed at the sealed portion 110b of the outer case 110.

According to aspects of embodiments of a secondary battery of the present invention, a plurality of positive electrode tabs and a plurality of negative electrode tabs may be formed by removing parts of the curved portions at either side of the positive electrode non-coating portion and negative electrode non-coating portion disposed at the upper and lower portions, respectively, of the electrode assembly in wound form. Also, by removing parts of the curved portions at either side of the positive electrode non-coating portion and negative electrode non-coating portion, a plurality of positive electrode tabs and a plurality of negative electrode tabs may be bent to increase internal space efficiency of the outer case and reduce weight of the secondary battery by the amount removed. Further, by removing a part of the positive electrode non-coating portion and a part of the negative electrode non-coating portion, the amount of electrolyte adhered to the non-coating portions can be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising an electrode assembly formed through winding about a winding axis a positive electrode plate including a positive electrode coated region where a positive electrode active material is coated, and a positive electrode non-coating portion that does not have the positive electrode active material at a first end of the electrode assembly, a negative electrode plate including a negative electrode coated region where a negative electrode active material is coated, and a negative electrode non-coating portion that does not have the negative electrode active material at a second end of the electrode assembly, and a separator between the positive and negative electrode plates, wherein a part of the positive electrode non-coating portion and a part of the negative electrode non-coating portion are removed at both sides to form a positive electrode tab of a remaining portion of the positive electrode non-coating portion and a negative electrode tab of a remaining portion of the negative electrode non-coating portion at the first and second ends, respectively, of the electrode assembly, such that the positive electrode non-coating portion is not present at the first end at both sides of the positive electrode tab, and the negative electrode non-coating portion is not present at the second end at both sides of the negative electrode tab, the positive electrode tab including wound portions of the positive electrode plate that are bent in a height direction and coupled together, the height direction being perpendicular to the winding axis, a width of the positive electrode tab being less than a width of the positive electrode coated region in a widthwise direction perpendicular to each of the direction and the winding axis, the negative electrode tab including wound portions of the negative electrode plate that are bent in the height direction and coupled together, and a width of the negative electrode tab being less than a width of the negative electrode coated region in the widthwise direction.

2. The secondary battery as claimed in claim 1, wherein the removed part of the positive electrode non-coating portion includes a curved portion at both sides, and the removed part of the negative electrode non-coating portion includes a curved portion at both sides.

3. The secondary battery as claimed in claim 1, further comprising an outer case containing the electrode assembly.

4. The secondary battery as claimed in claim 3, wherein the positive electrode tab is bent inside the outer case.

5. The secondary battery as claimed in claim 4, wherein the positive electrode tab is bent in a V-shape, a U-shape, or an S-shape.

6. The secondary battery as claimed in claim 3, wherein the negative electrode tab is bent inside the outer case.

7. The secondary battery as claimed in claim 6, wherein the negative electrode tab is bent in a V-shape, a U-shape, or an S-shape.

8. The secondary battery as claimed in claim 1, further comprising a positive electrode terminal attached to the positive electrode tab, and a negative electrode terminal attached to the negative electrode tab.

9. The secondary battery as claimed in claim 8, wherein the positive electrode terminal has a width corresponding to the width of the positive electrode tab, and the negative electrode terminal has a width corresponding to the width of the negative electrode tab.

10. The secondary battery as claimed in claim 1, wherein the positive electrode tab comprises a plurality of stacked layers of the positive electrode non-coating portion coupled together, and the negative electrode tab comprises a plurality of stacked layers of the negative electrode non-coating portion coupled together.

* * * * *